(12) United States Patent
Gupta et al.

(10) Patent No.: US 8,244,946 B2
(45) Date of Patent: Aug. 14, 2012

(54) INTERRUPT MODERATION

(75) Inventors: Somesh Gupta, San Jose, CA (US);
Venkatesh Nagapudi, Milpitas, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 413 days.

(21) Appl. No.: 12/580,913

(22) Filed: Oct. 16, 2009

(65) Prior Publication Data
US 2011/0093637 A1  Apr. 21, 2011

(51) Int. Cl.
*G06F 13/00* (2006.01)
*G06F 9/48* (2006.01)

(52) U.S. Cl. .................... 710/263; 710/260
(58) Field of Classification Search .......... 710/260, 710/261, 263, 264
See application file for complete search history.

(56) References Cited

U.S. PATENT DOCUMENTS

| | | | |
|---|---|---|---|
| 7,065,598 B2* | 6/2006 | Connor et al. ............ 710/260 |
| 7,263,568 B2* | 8/2007 | Shah et al. ............... 710/267 |
| 7,290,076 B2* | 10/2007 | Valenci .................... 710/260 |
| 7,478,186 B1* | 1/2009 | Onufryk et al. .......... 710/263 |
| 7,634,589 B2* | 12/2009 | Anand et al. ............. 710/15 |
| 7,788,434 B2* | 8/2010 | Pesavento et al. ........ 710/262 |
| 7,987,307 B2* | 7/2011 | Sarangam et al. ........ 710/260 |
| 2007/0271401 A1* | 11/2007 | Louzoun et al. ......... 710/264 |
| 2008/0235424 A1* | 9/2008 | Lee et al. ................. 710/260 |
| 2010/0169528 A1* | 7/2010 | Kumar et al. ............ 710/263 |
| 2010/0262740 A1* | 10/2010 | Borchers et al. ......... 710/263 |

OTHER PUBLICATIONS

"PCI Local Bus Specification Revision 2.3"; Joe Cowan; Jun. 10, 2003.

\* cited by examiner

*Primary Examiner* — Glenn A Auve
(74) *Attorney, Agent, or Firm* — Wong, Cabello, Lutsch, Rutherford & Brucculeri, L.L.P.

(57) ABSTRACT

A technique for interrupt moderation allows coalescing interrupts from a device into groups to be processed as a batch by a host processor. Receive and send completions may be processed differently. When the host is interrupted for receive completions, it may check for send completions, reducing the need for interrupts related to send completions. Timers and a counter allow coalescing interrupts into a single interrupt that can be used to signal the host to process multiple completions. The technique is suitable for both dedicated interrupt line and message-signaled interrupts.

27 Claims, 9 Drawing Sheets

INTERRUPT MODERATION

TECHNICAL FIELD

The present invention relates to the field of computing, and in particular to techniques for handling interrupts from a device to a processor.

BACKGROUND ART

Interrupts are a way of indicating to a processor that some event has occurred that needs processor attention, such as the completion of a read or write by a device. Historically, hardware interrupts used one of a small number of dedicated interrupt lines (typically designated INT0, INT1, . . . , INTx) that triggered the processor to run an interrupt handler to process the interrupt. The interrupt signaled on an INTx line is typically associated with a direct memory access (DMA) write by the source of the interrupt to provide needed information for use by the interrupt handler.

A more recent approach to interrupts, known as message-signaled interrupts (originally, MSI, but now MSI-X after the addition of certain extensions to the original MSI definition) that avoid the need for dedicated interrupt lines. An MSI-X interrupt is a message, for example sent over a PCI bus from the device to the processor, typically as a memory write or dedicated message type that results in a DMA write to a predetermined MSI-X address. The message written to the MSI-X address identifies the interrupt type, but data associated with the interrupt is written by a separate memory write, instead of in the message itself.

In high-speed communications networks, where each read or write completion on a communications link would ordinarily trigger an interrupt from a network interface controller (NIC) to a host processor, the host processor can become swamped with interrupts, without some technique for limiting when and how often interrupts may be signaled to the host processor. For example, two 10 Gigabit Ethernet ports if fully utilized may push up to ten million events per second to the host processor.

In conventional systems, a DMA occurs upon every send completion, typically DMAing a consumer pointer or other completion information to a host. This may lead to excessive DMAs, putting an excessive load on the host. In other conventional systems, a DMA for a send completion occurs only on interrupts, leading to excessive latency, which can be especially harmful at 10 Gb/s or higher link speeds. In yet other conventional systems, an interrupt occurs upon every receive completion, leading to excessive interrupts.

SUMMARY OF INVENTION

According to one embodiment, a method comprises initializing a first timer in a device, determining whether an interrupt condition exists in the device upon expiration of the first timer, triggering an interrupt of a host if an interrupt condition exists, and reinitializing the first timer upon receiving an acknowledgment of the interrupt from the host.

According to another embodiment, a queue manager comprises a plurality of interrupt blocks, each comprising a first timer; an index table, configured for storing information for servicing interrupts; and interrupt coalescing logic, comprising first timer initialization logic, configured to initialize the first timer to a first predetermined value; interrupt condition logic; first timer expiration logic, configured to trigger an interrupt upon expiration of the first timer if the interrupt condition logic indicates an interrupt condition exists; and interrupt acknowledgment logic, adapted to cause the first timer initialization logic to initialize the first timer responsive to receiving an interrupt acknowledgment.

According to yet another embodiment, a peripheral device comprises receive agent logic; transmit agent logic; direct memory access logic, adapted to perform direct memory access writes to a memory, coupled to the receive agent logic and the transmit agent logic; a queue manager, coupled to the receive agent logic, the transmit agent logic, and the direct memory access logic; a plurality of interrupt blocks, each comprising a first timer; an index table, configured for storing information for servicing interrupts corresponding to the plurality of queues; and interrupt coalescing logic, comprising first timer initialization logic, configured to initialize the first timer to a first predetermined value; interrupt condition logic; first timer expiration logic, configured to trigger an interrupt upon expiration of the first timer if the interrupt condition logic indicates an interrupt condition exists; and interrupt acknowledgment logic, adapted to cause the first timer initialization logic to initialize the first timer responsive to receiving an interrupt acknowledgment.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

In the following description, for purposes of explanation, numerous specific details are set forth in order to provide a thorough understanding of the invention. It will be apparent, however, to one skilled in the art that the invention can be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although the following description is set forth in the context of a network interface controller for a device capable of handling Ethernet, the present invention is not limited to network interface controllers or Ethernet technology and may be implemented in other types of devices that signal interrupts to host processors.

Figure 1:
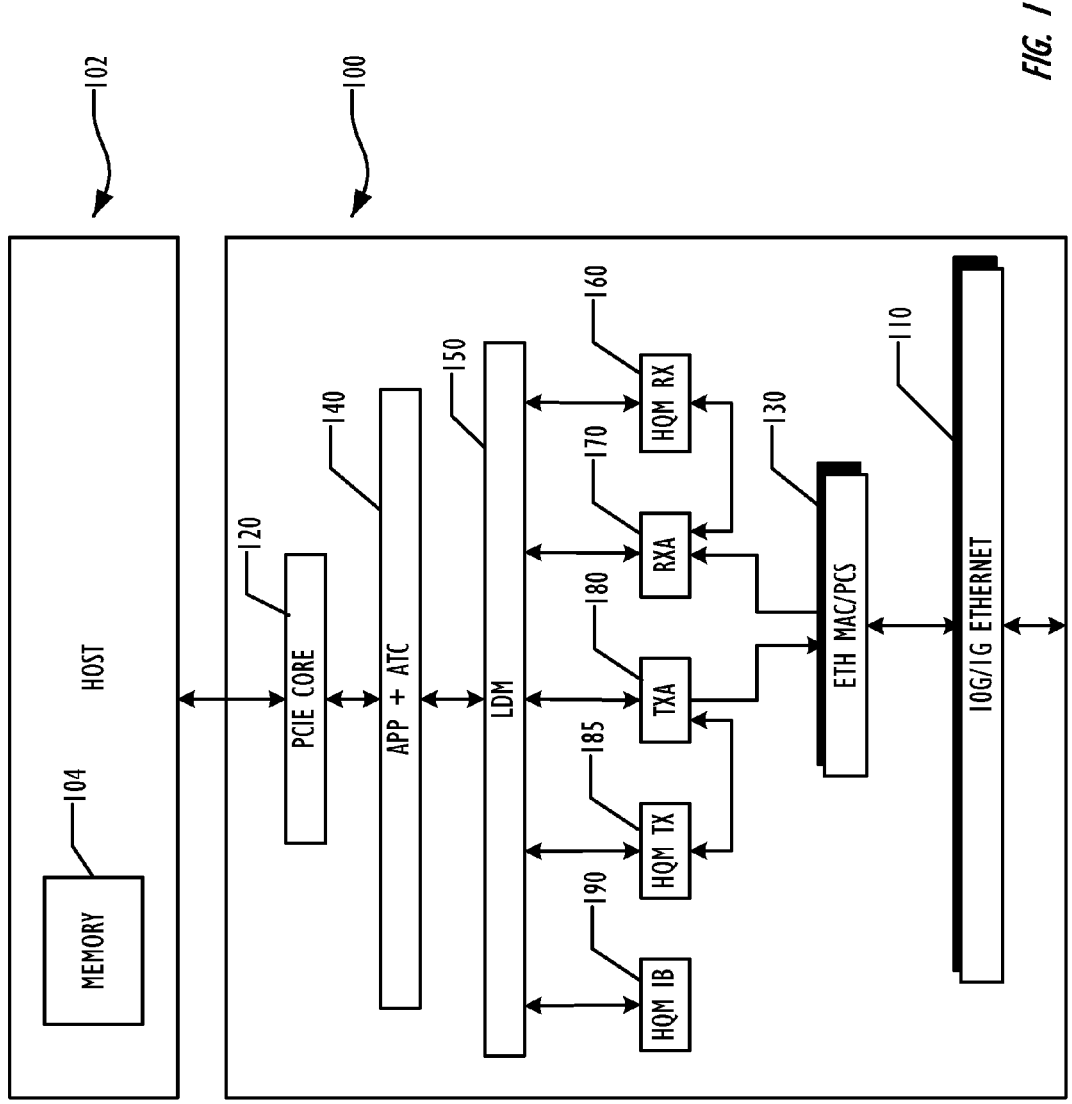
FIG. 1 is a high-level block diagram illustrating a network device according to one embodiment.

FIG. 1 is a simplified high-level block diagram illustrating a peripheral device 100 capable of performing interrupt moderation according to one embodiment. As illustrated in FIG. 1, the device 100 is a network interface card (NIC) for communicating with a 10 Gigabit Ethernet or 1 Gigabit Ethernet communications link (not shown). The device 100 is illustrative and by way of example only, and any other type of device capable of generating interrupts to a host can be used. In particular, the device 100 can be a converged dual 10 G Networking and Storage Fibre Channel over Convergence Enhanced Ethernet (FCoCEE) device, capable of connecting to both Gigabit Ethernet and Fibre Channel links simultaneously. Certain elements of the device 100 not relevant to the present description are omitted for clarity. For a more detailed description of such a device, please refer to U.S. patent application Ser. No. 12/570,565, filed Sep. 30, 2009, and entitled "User Selectable Multiple Protocol Network Interface Device," which is hereby incorporated by reference in its entirety.

An Ethernet interface serialization/deserialization (SERDES) logic 110 connects the device 100 to the Ethernet link (not shown). An Ethernet media access control (MAC) logic 130 connects between the SERDES 110 and transmit/receive agents 170, 180. Receive and transmit agents 170, 180 connect to a multi-channel direct memory access (DMA) engine 150, which is responsible for performing DMA actions into a memory 104 of host 102. Receive agent 170 accepts inbound packets and sends them to host memory 104, while transmit agent 180 sends outbound packets from host memory 104 to the MAC 130, for delivery on the Ethernet link.

In this embodiment, the device 100 is a Peripheral Component Interconnect Express (PCIe) device, but other techniques for communicating with the host 102 can be used. An APP+ATC logic 140 interfaces between the DMA engine and a PCIe core logic 120, collecting DMA requests and sending them to the PCIe core logic 120, and routing completions back to the DMA engine 150. The APP+ATC logic 140 provides interrupt processing for the device 100. The APP+ATC logic 140 also provides address translation related to requests to and from the PCIe core logic 120.

Logic blocks 160, 185, and 190 provide a host queue manager (HQM) functionality for the device 100. The HQM IB logic 190 provides interrupt coalescing functionality. The HQM TX logic 185 manages transmit queues for the transmit agent (TXA) 180. The HQM RX logic 160 manages receive queues and completion queues for the receive agent (RXA) 170.

Figure 2:
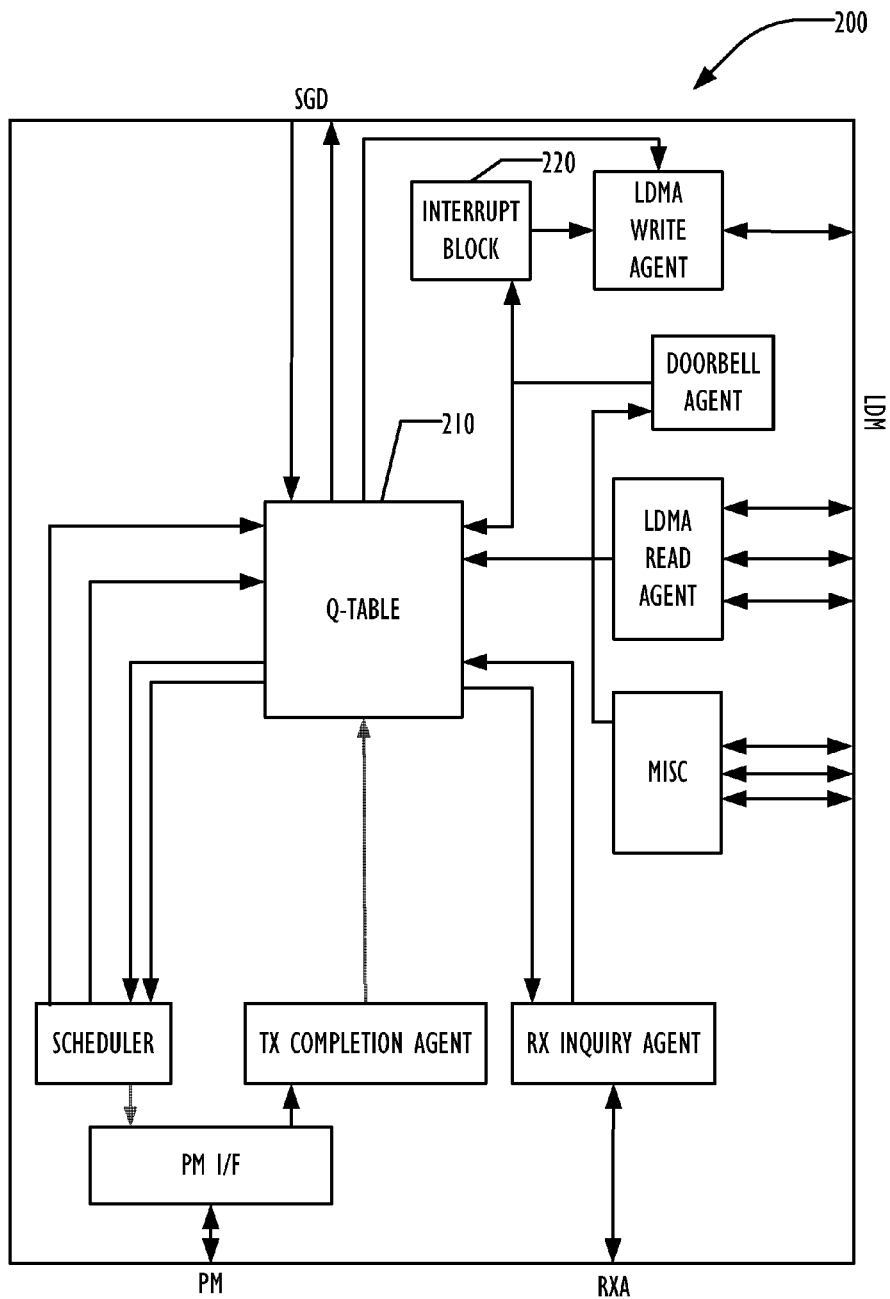
FIG. 2 is a diagram illustrating a host queue manager (HQM) according to one embodiment.

Although illustrated in FIG. 1 as three separate logic blocks, in one embodiment, illustrated in FIG. 2, the HQM IB 190, HQM TX 185, and HQM RX 160 are implemented in a single HQM logic block 200. HQM logic 200 may be implemented as a separate chip or as part of a larger application specific integrated circuit (ASIC).

In the HQM 200 illustrated in FIG. 2, the various transmit, receive, and completion queues provided by the HQM 200 are provided in a common Q-table 210. In one embodiment, the Q-table 210 provides for up to 64 receive queues (RQs), 64 transmit queues (TQs), and 64 completion queues (CQs). The number of queues is illustrative and by way of example only, and any desired number of queues can be provided. Although in the embodiment of FIG. 2, the Q table 210 structure is implemented on the die to minimize latency, off-die implementations can be provided, including mixtures of on-die and off-die extensions. The implementation of queues in a memory is well known in the art and is not further describe herein. Three kinds of queues (RXQs, TXQs, and CQs) are of significance to this description and are described further below.

An RXQ is used for received data that is to be DMAed up to the host buffers in host memory 104. A TXQ is used for data received from the host 102 to be sent over a communications link. The actual data to be sent or received is stored in other buffers, with the control information necessary to transmit the data on the link or DMA the data to the host 102 stored in the RXQs and TXQs.

Entries in an RXQ point to receive buffers for incoming packets. The host 102 is the producer to the RXQ, providing empty buffers, and the device 100 is the consumer. The host 102 adds entries to the RXQ and issues a doorbell to the device 100 for the specific RXQ. The host 102 may add entries to the RXQ and issue more doorbells without waiting for feedback from the device 100. The device 100 reports a completion on a CQ for every packet and the host 102 figures out how many entries have been consumed and deleted from the RXQ. Thus the device 100 is the producer to the CQ and the host 102 the consumer. The device 100 updates the CQ producer pointer in host memory 104 through an interrupt as described below.

Entries in a TXQ describe packets for transmission by the device 100. The host 102 is the producer to the TXQ and the device 100 the consumer. The host 102 adds entries to the TXQ and issues doorbells to the device 100 for the specific TXQ, without waiting for feedback from the device 100. The doorbells trigger the device 100 to transmit the packet, DMAing in the packet payloads from the host memory 104 and sending them out across the link connected to the SERDES 110. The TXQ consumer pointer is updated by the device 100 in the host memory 104 through an interrupt as described below. The host 102 determines how may TXQ entries have been processed by examining the TXQ consumer pointer.

Among the information contained in an RXQ entry is a pointer to a CQ associated with the RXQ. CQs provide additional control and status information for use by a device driver. In one embodiment, every RXQ points to a CQ, and multiple RXQs may share a single CQ. In one embodiment, a TXQ does not use a CQ. The data structures contained in the RXQs and TXQs are not further discussed in this description and are outside the scope of the present invention.

The device 100 can fill millions of buffers per second at the full speed of the 10 Gigabit Ethernet port. Therefore, to avoid swamping the host 102 with interrupts, a technique for interrupt moderation, i.e., coalescing interrupts, is desired to avoid high interrupt rates, but at the same time minimizing latency.

An array of interrupt blocks (IBs) 220 is also provided by the HQM. In addition to the Q-table 210 and the IB array 220, the HQM 200 provides interfaces to the RXA 170, the TXA 180, the DMA engine 150, and a packet manager (PM) (not shown) that aggregates inbound and outbound packets.

Figure 3:
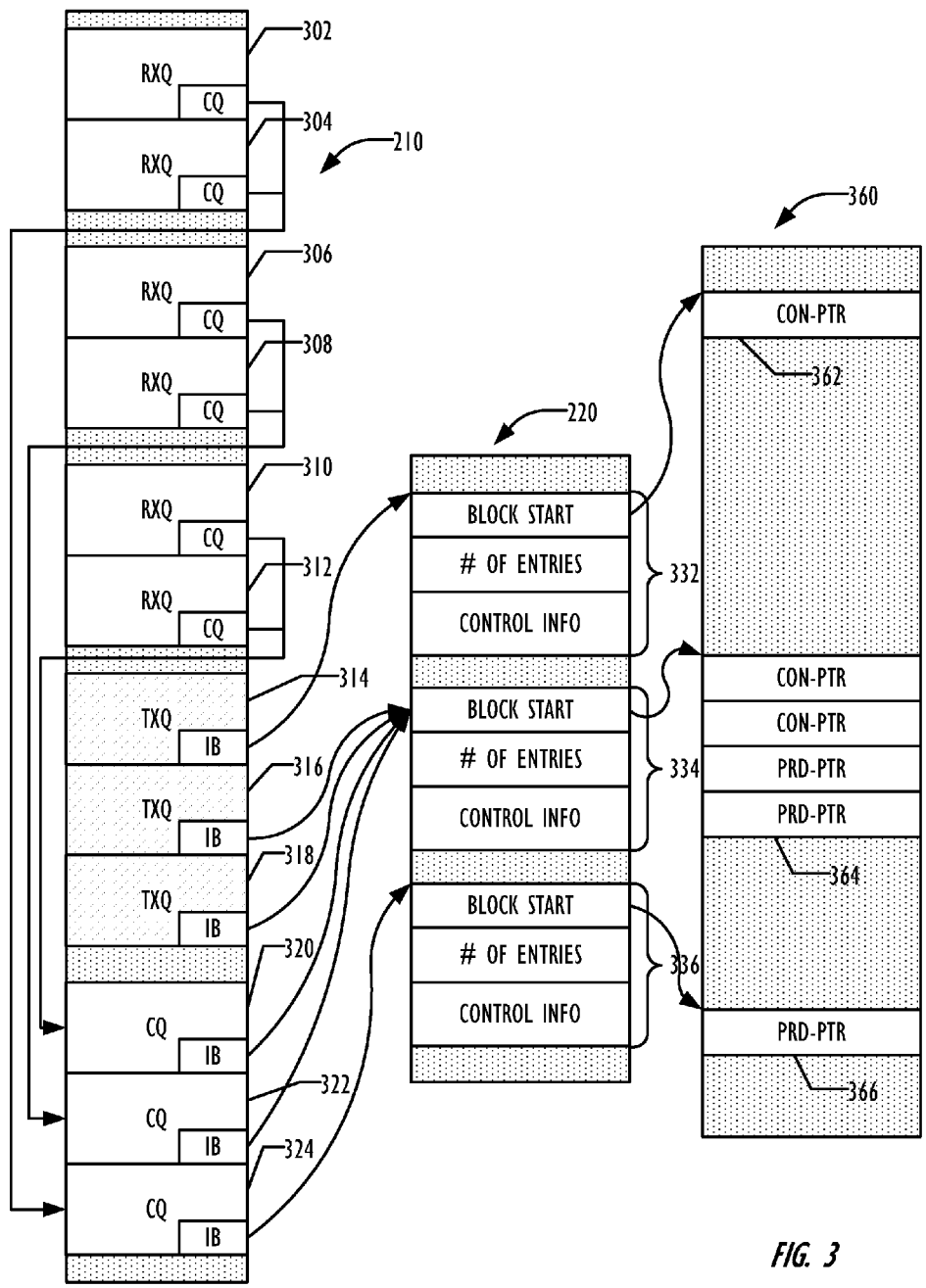
FIG. 3 is a block diagram illustrating relationships among various data structures used by the HQM of FIG. 2 according to one embodiment.

Turning now to FIG. 3, an example Q-table 210 provides storage for two RXQs 302, 304 that share CQ 324, two RXQs 306, 308 that share CQ 322, and two RXQs 310, 312 that share CQ 320. The Q-table also provides storage for three TXQs 314, 316, 318.

Each of the CQs 320, 322, 325 in turn points to an IB in the array of IBs 220. Similarly, each of the TXQs 314, 316, 318 also point to an IB in the IB array 220. Each IB in the IB array 220 in turn points to a block of one or more entries in a global index table 360, which contains consumer or producer pointers into buffers in host memory 104 used for the read and write operations. The global index table 360 is also contained in the HGM 200, in one embodiment; in other embodiments, the index table can be on-die with the other HQM 200 elements described above. These blocks of index table entries are DMAed to the host 102 as a block just before an interrupt for the corresponding IB is generated, instead of being sent individually with separate interrupts, reducing the load on the host 102.

The structure of an IB is described further below, but each IB contains at least three fields: the pointer to the start of a block of entries in the index table 360, a number of entries contained in the index table block, and additional control information. In the example illustrated in FIG. 3, TXQ 314 points to a first IB 332, which in turn points to a consumer pointer 362 in the index table 360. Only one TXQ points to IB 332, so there is only one entry in the index table block pointed to by the IB 332. Similarly, only CQ 324 points to IB 336, thus there is only one entry in the index table block pointed to by IB 336.

In contrast, CQs 320, 322, and TXQs 316, 318 all point to IB 334, thus the block of entries in the index table 360 pointed to by IB 334 contains 4 entries: two consumer pointers for TXQs 316, 318, and two producer pointers for RXQs 320, 322.

Figure 4:
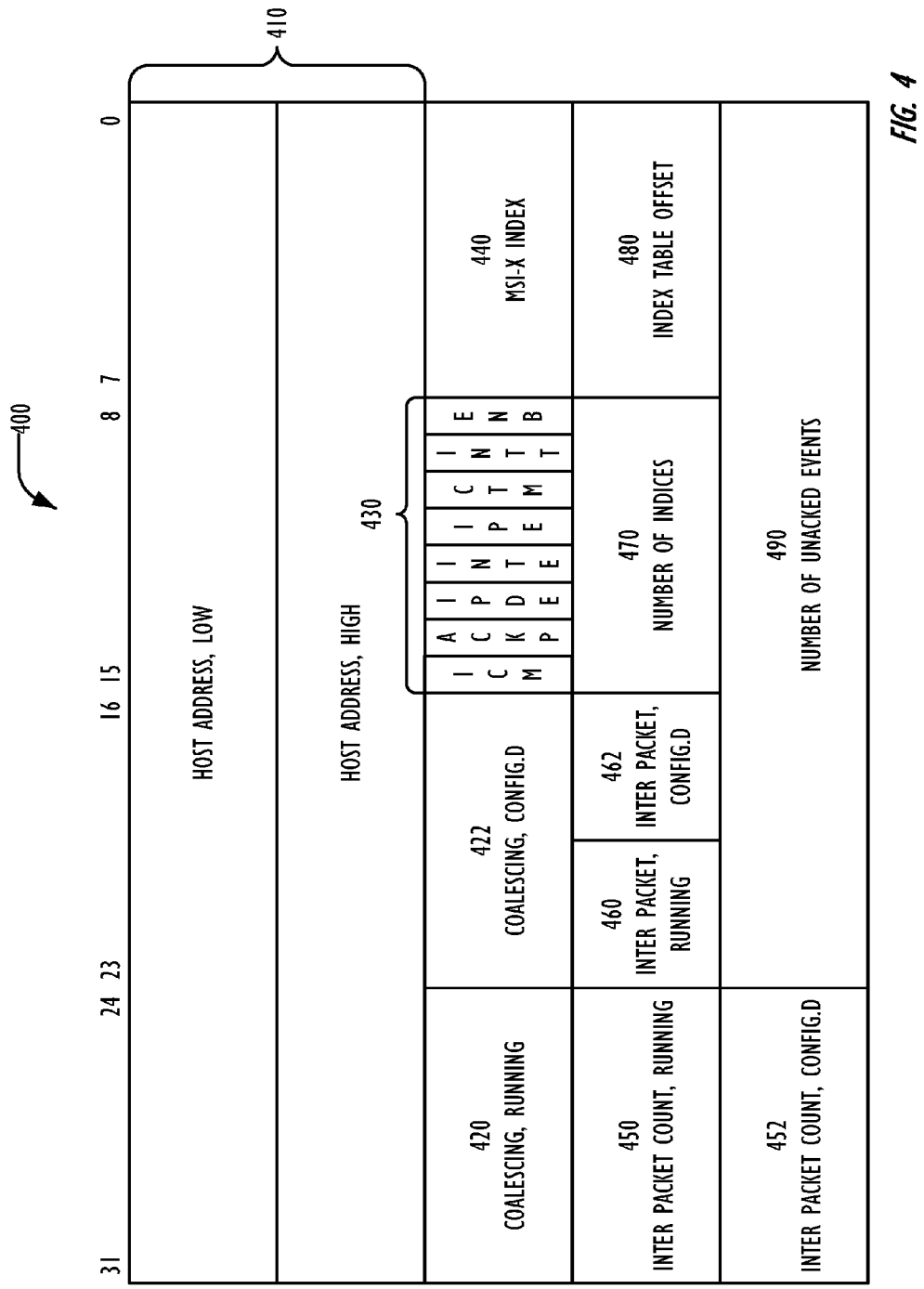
FIG. 4 is a block diagram illustrating one embodiment of an interrupt block (IB) data structure.

FIG. 4 is a block diagram illustrating an IB 400 in the IB array 220 according to one embodiment. A pointer 410 contains the address in the host memory 104 to which the index table 360 entries associated with the IB 400 are written. In the illustrated embodiment, the host address is a 64-bit address. An index table offset 480 points to the start of a block of entries in the index table 360, and a number of indices field 470 indicates the number of index table entries in the block pointed to by the IB 400. Thus, the IB 334 in FIG. 3 has an index table offset 480 field that points to the offset of the block 364 from the beginning of index table 360, and the number of indices field 470 contains a 4.

Field 490 in the IB 400 indicates how many completion notifications for the IB 400 have not been acknowledged by the host 102. When the interrupt is enabled, this field is decremented by acknowledgment doorbells.

The IB 400 allows coalescing interrupts using two timers, the coalescing timer 420 and the inter-packet timer 450, as well as a packet counter 460. These timers and counter are described below.

Interrupt coalescing with the coalescing timer uses two fields 420 and 422. Field 422 contains a configuration value that can be programmed in the HQM 200, indicating how long to wait before generating an interrupt, while field 420 indicates the current value of the timer. In one embodiment, the timer is initialized at the configuration value and counts down to zero, thus indicating the remaining time in the configured period; in another embodiment, the time is initialized at zero and counts up to the configuration value, thus indicates the time since the timer started, and the timer is said to expire when it reaches the zero or configuration value, depending on the counting direction. In one embodiment, the configuration value in field 422 and the current value of the timer in field 420 are expressed in 5 μsec units. In some embodiments, the units are configurable.

A second pair of fields 450, 452 describe an inter-packet timer. Field 452 is a configuration value indicating how long to wait between a train of completion notifications, while field 450 indicates the current value of the timer. As with the coalescing timer 420, 422, the field 450 in one embodiment counts down from the configured value; in another embodiment, the field counts up from zero to the configured value. In either embodiment, the timer is said to expire when it reaches the final value. In one embodiment, both fields 450, 452 are expressed in 0.5 μsec units. In some embodiments, the units are configurable. In one embodiment, the inter-packet timer can be disabled by setting the configuration value 452 to zero.

A counter is provided in fields 460, 462. This counter indicates the number of packets to count before generating an interrupt condition, and is related to the inter-packet timer 450, 452. Field 462 indicates the configured value and field 460 indicates the value of the counter. As with the coalescing and inter-packet timers, the counter value 460 can count down to zero or up to the configured value 462.

As illustrated in FIG. 4, the operation of the timers and counter are controlled by flags 430. An ENB flag indicates the IB 400 is enabled. An INTT flag indicates whether the IB 400 is in MSI-X or INTx mode. A CTM flag indicates whether the coalescing timer 420, 422 is in continuous or one-shot mode, as described below. An IPE flag indicates whether the inter-packet mechanism of the inter-packet timer and counter is enabled. An INTE flag indicates whether an interrupt is generated when the conditions of the timers and counter are met. An IPDE flag indicates whether a DMA operation of the index table is performed when the inter-packet counter reaches its configured value, but an interrupt is not generated. In one embodiment, the IPE and IPDE flags are mutually exclusive. An ACKP flag indicates that the IB 400 has generated an interrupt and is waiting for the host 102 to acknowledge the interrupt. An ICM flag indicates that the conditions to generate an interrupt have been met and the coalescing timer has expired.

The structure of the IB 400, including the names, arrangement, sizes, and number of fields contained therein, is illustrative and by way of example only, and other IB 400 structures can be used as desired.

Each IB 400 may be configured independently. For example, the coalescing timer in one IB 400 may be set to a first configuration value 422, while the coalescing timer in another IB 400 may be set to a second and different configuration value 422. Similarly, configuration logic may configure the inter-packet mechanism timer and counter independently.

Similarly, the HQM 200 is configurable to associate the RXQs with CQs and the TXQs and CQs with IBs as desired, as well as associating RXQs, TXQs, and CQs with functions of the peripheral device 100, allowing flexibility in processing interrupts differently for different functions of the peripheral device 100 as desired. For example, an individual function of the peripheral device 100 may be allocated two RXQs, each configured for different size buffers.

Based on the configurable timers and counter described above, the IB 400 manages the decision of both interrupt generation and the DMA of the index table 360 block holding its indices. A DMA occurs when the inter-packet counter 450 expires and the IDDE flag is set. A DMA also occurs on any interrupt trigger, even if the interrupt itself is not enabled.

An interrupt condition occurs when the IPE flag is enabled and the inter-packet timer has expired with no completion indication or the inter-packet counter 450 expires based on the configured value 452. An interrupt condition also occurs if the IPE flag is disabled and the number of unacknowledged completion notifications is non-zero.

An interrupt trigger occurs when the coalescing timer 420 expires and an interrupt condition exists. An interrupt is generated when the interrupt trigger occurs and interrupts are enabled for the IB 400 by the IPE flag.

The coalescing timer 420 in one embodiment can operate in either one-shot or continuous mode, depending on the CTM flag of the flags 430. In both modes, if the timer 420 expires and an interrupt condition exists, then an interrupt trigger occurs. The difference between the modes is what happens if an interrupt condition does not exist when the timer 420 expires.

In one-shot mode, the coalescing timer 420 is kept expired until the next interrupt is acknowledged, thus an interrupt trigger immediately occurs upon the occurrence of an interrupt condition. In continuous mode, in contrast, the coalescing timer 420 is reset to its initial value if no interrupt condition has occurred when the timer 420 expires, restarting the timer. Thus, a later arriving interrupt condition does not trigger an interrupt until the next expiration of the coalescing timer.

Figure 5:
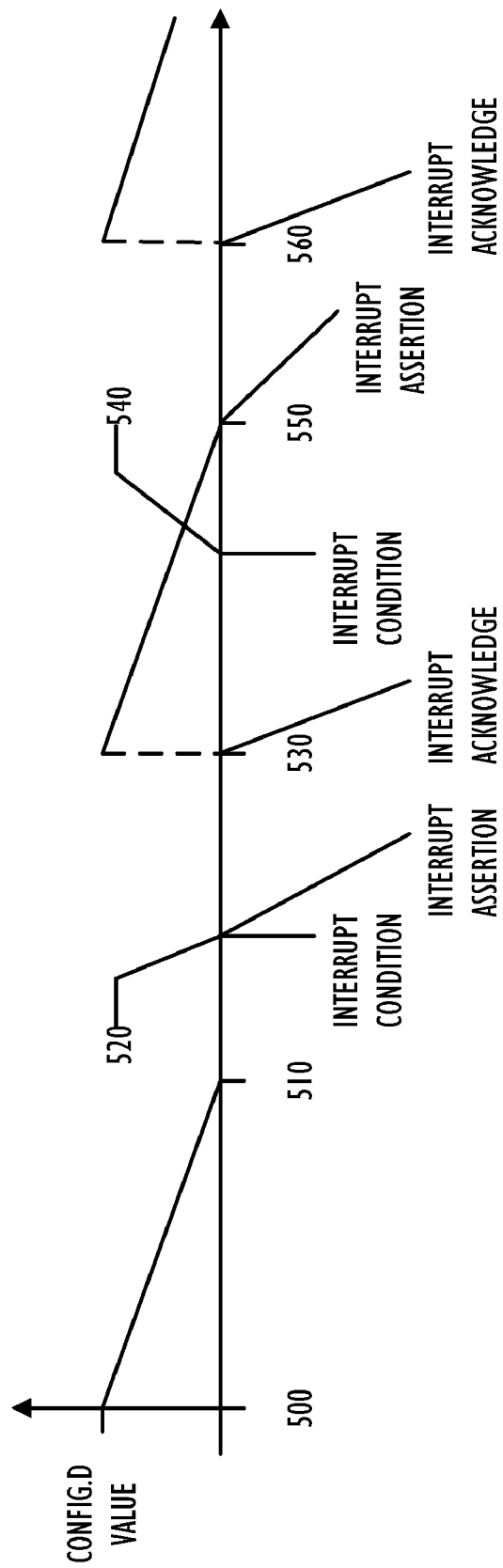
FIG. 5 is a graph illustrating interrupt coalescing using in a one-shot mode according to one embodiment.
Figure 6:
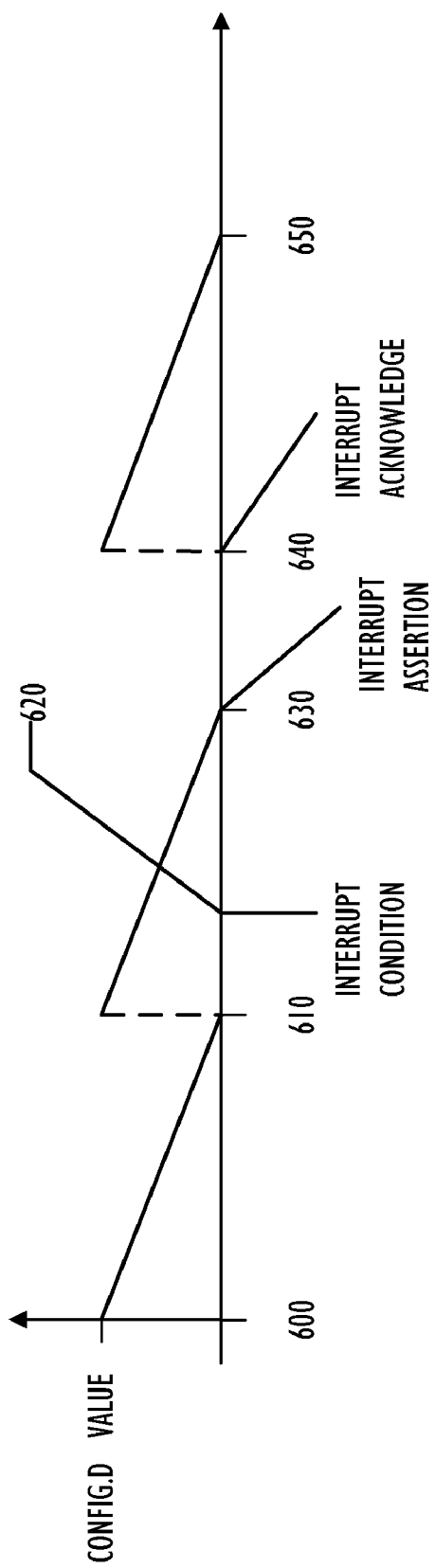
FIG. 6 is a graph illustrating interrupt coalescing in a continuous mode according to one embodiment.

These modes are further illustrated by the graphs of FIGS. 5 and 6. FIG. 5 illustrates one-shot mode, and FIG. 6 illustrates continuous mode. In the examples of FIGS. 5 and 6, the coalescing timer is illustrated according to an embodiment where the timer 420 is initialized at the configuration value 422, and counts down to zero. In the discussion that follows, interrupts are presumed enabled for the IB 400. Thus, when an interrupt is triggered, the interrupt is actually asserted.

Turning first to FIG. 5, at time 500 the coalescing timer field 420 is set to the configuration value 422 and counts down until time 510. Because no interrupt condition has occurred, no interrupt is triggered at time 510. Because the coalescing timer 420 is in one-shot mode, it stays in the expired state. In time 520, an interrupt condition occurs, causing an interrupt to be triggered. The coalescing timer 420 remains in an expired state and is not reset until time 530, when the host 102 acknowledges the interrupt generated at time 520. The coalescing timer 420 is then reinitialized to the configuration value 422 and restarted. Then, at time 540, an interrupt condition occurs. The interrupt is not triggered immediately, but when in time 550 the coalescing timer 420 expires, an interrupt is triggered. The timer 420 stays expired until the interrupt is acknowledged by the host 102 at time 560.

FIG. 6 is a graph that illustrates an example sequence with the coalescing timer 420 in continuous mode. As with FIG. 5, the coalescing timer 420 is initialized at time 600. When the timer 420 expires at time 610, because no interrupt condition exists, the timer is reinitialized. During the second running of the timer 420, an interrupt condition occurs at time 620, so when the coalescing timer 420 expires at time 630, an interrupt is triggered at that time. The time 420 now stays in the expired state until the interrupt asserted at time 630 is acknowledged at time 640, at which point the coalescing timer 420 is restarted to expire at time 650.

The coalescing timer 420 by itself may still allow more interrupts than desired. In particular, an interrupt condition is preferably avoided on the first packet of a train of packets, as may otherwise occur when the coalescing timer is in one-shot mode.

The inter-packet mechanism of the inter-packet timer 460 and counter 450 further interact with the coalescing timer to moderate the generation of interrupts, by delaying the occurrence of interrupt conditions. If the inter-packet mechanism is enabled, then an interrupt condition will not occur until the expiration of either the inter-packet timer 460 or the expiration of the counter 450. If the inter-packet mechanism is disabled, then an interrupt condition exists whenever there are any completion notifications that have not yet been acknowledged by the driver for this IB 400.

By using the inter-packet timer 460 and inter-packet counter 450, a train of packets may not trigger an interrupt condition. Instead, the arrival of the first packet may start the inter-packet timer 460. If another packet does not arrive before the inter-packet timer 460 expires, then an interrupt condition may be triggered. If another packet does arrive before the inter-packet timer 460 expires, the inter-packet counter 450 may be updated. If new packets arrive quickly enough that the inter-packet timer 460 does not expire, but the inter-packet counter 450 reaches is configured value 452, then an interrupt condition may be triggered, avoiding excessive latency.

In one embodiment, the inter-packet counter configuration value 450 is overloaded, with its value interpreted differently depending on which of the IPE or IPDE flags are set. If the IPDE flag is set, then the inter-packet counter configuration value 450 may indicate the number of send completions for the device 100 to wait before DMAing the indices 360 associate with the IP 400 to the host. If the IPE flag is set, however, the inter-packet configuration value 450 may indicate the number of back-to-back receive packets for which the interrupt condition may be delayed. The inter-packet timer 460 and inter-packet counter 450 thus allow avoiding excessive interrupts on read completions while avoiding excessive latency on busy links. The inter-packet timer 460 and inter-packet counter 450 also allow processing of send completions without waiting for interrupts, thus reducing the number of send interrupts on a system that is sending packets, without avoiding excessive latency.

Figure 7:
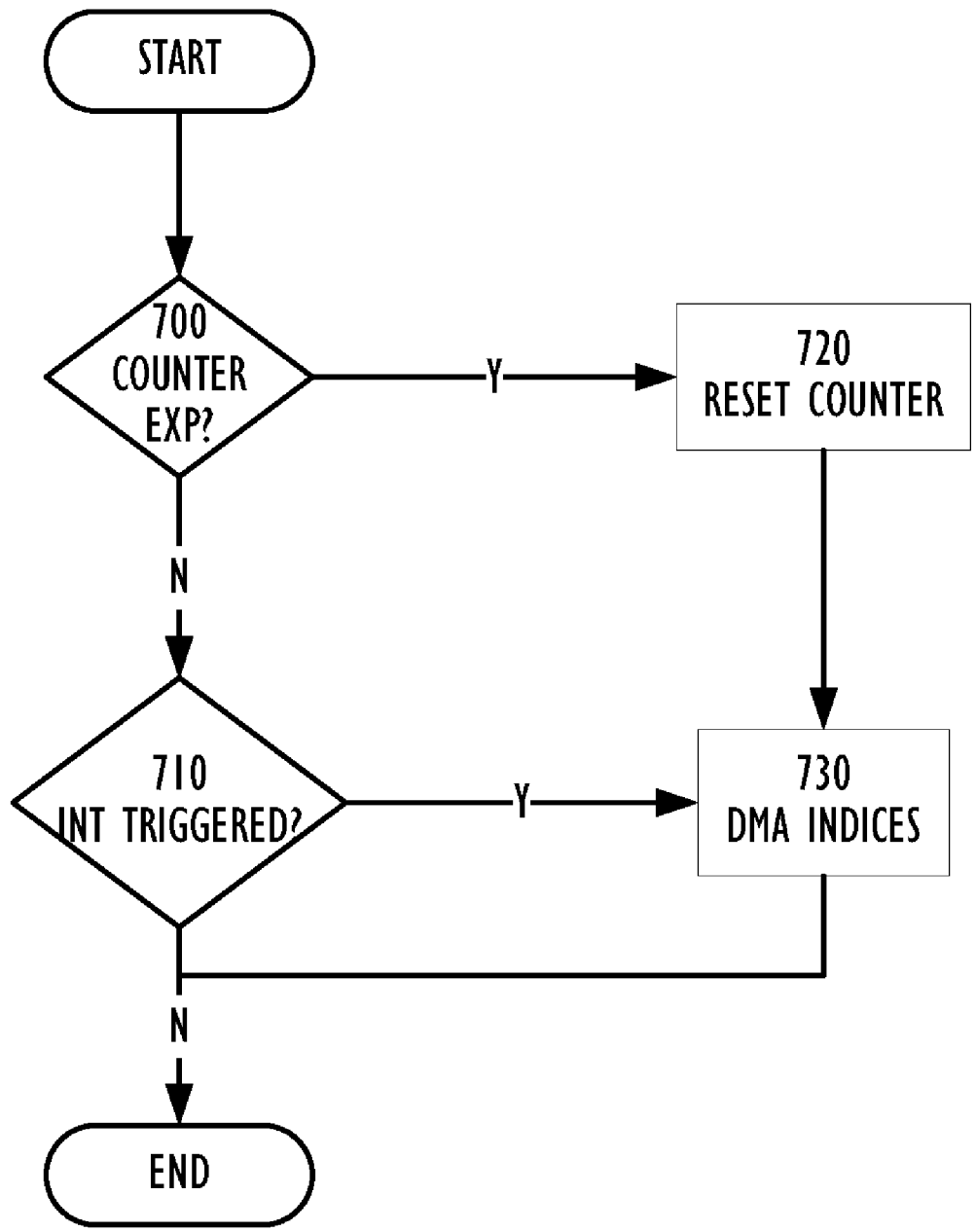
FIG. 7 is a flowchart illustrating DMA operations according to one embodiment.
Figure 8:
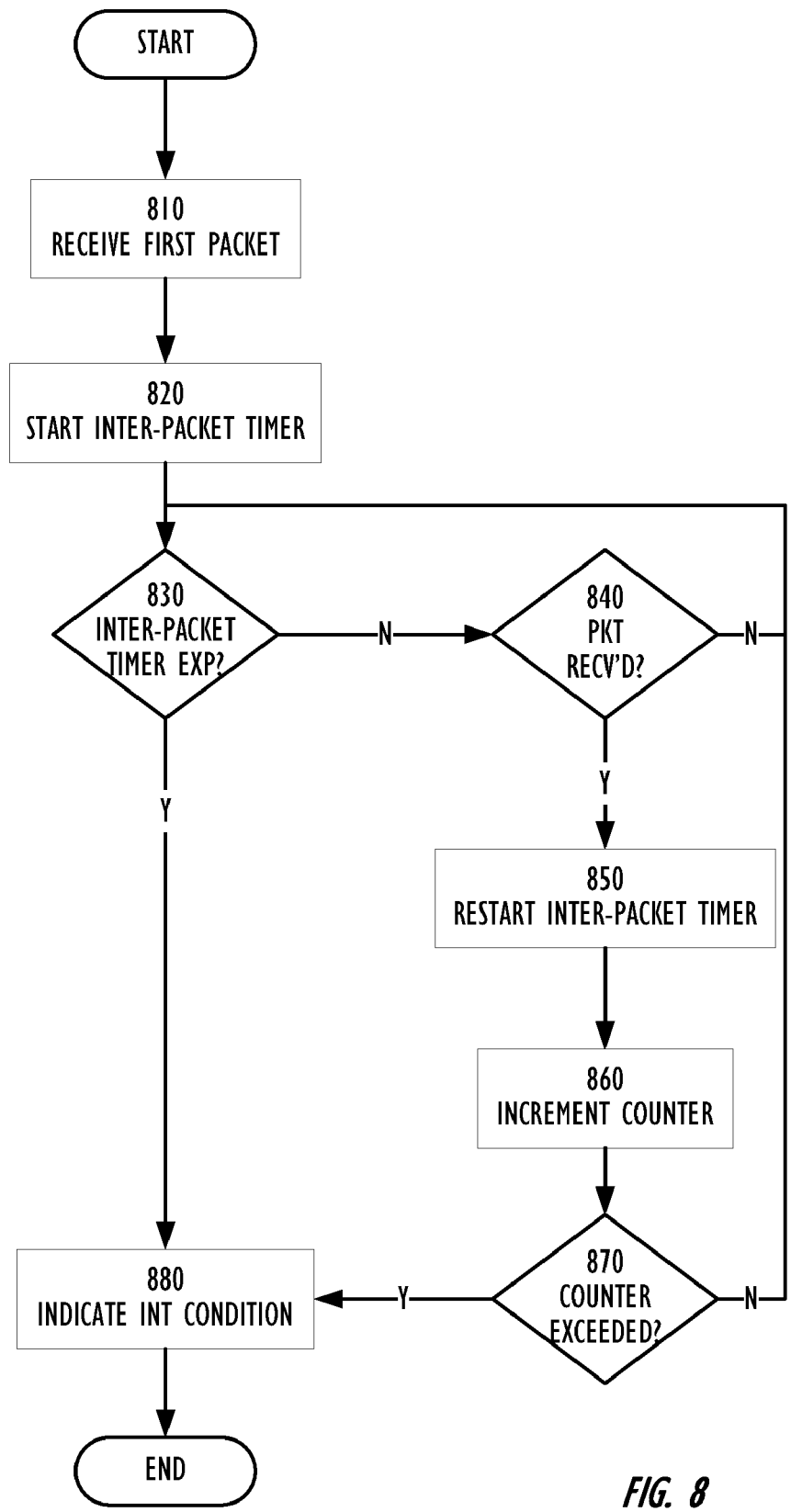
FIG. 8 is a flowchart illustrating the generation of an interrupt condition according to one embodiment.
Figure 9:
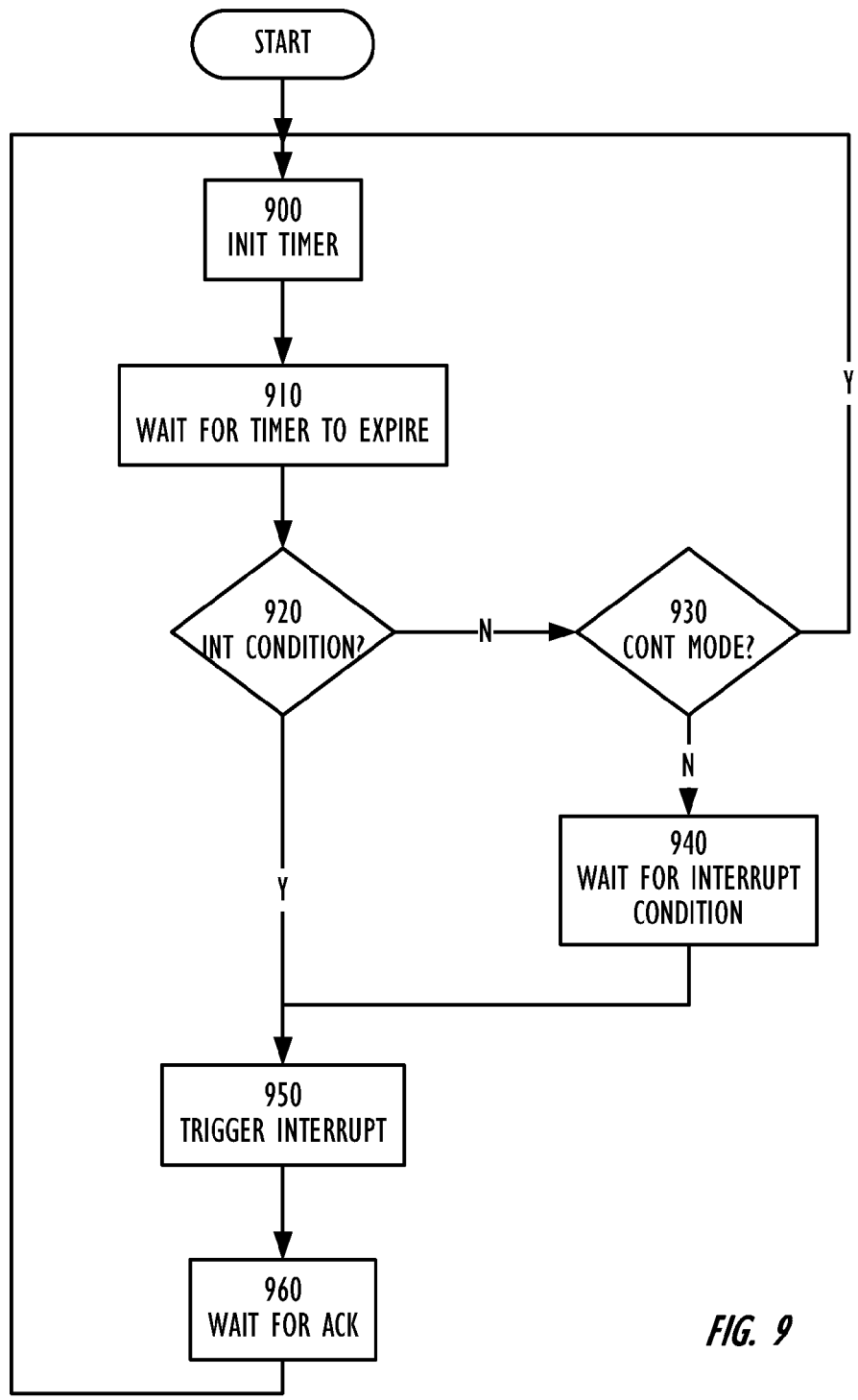
FIG. 9 is a flowchart illustrating the triggering of an interrupt according to one embodiment.

FIGS. 7-9 are flowcharts illustrating the use of the inter-packet mechanism and the coalescing timer to moderate the generation of interrupts according to one embodiment. FIG. 7 illustrates the generation of DMA requests based on the inter-packet counter and interrupt triggers when the IPDE flag is set. In block 700, if the inter-packet counter 450 has reached the configured value 452, then in block 720 the counter 450 is re-initialized and in block 730 the number of indices (indicated in field 470 of the IB 400) pointed to by the index table offset 480 are DMAed to host memory 104. If the inter-packet counter 450 has not reached the configured value 452, then in block 710 if an interrupt has been triggered, the indices defined by fields 470, 480 are DMAed in block 730. Thus, DMAs in this embodiment are delayed until either an interrupt has been triggered, or the inter-packet counter has expired. As indicated above, the triggering of a DMA by the inter-packet counter depends on the setting of the IPDE flag, which can disable DMAs that would otherwise be caused by the inter-packet counter.

FIG. 8 illustrates the generation of an interrupt condition when the IPE flag is set according to one embodiment. In block 810, a first packet is received. Then in block 820, the inter-packet timer 460 is started. When the inter-packet timer 460 expires in block 830, then in block 880 an interrupt condition is triggered. But block 840 indicates that if a packet arrives before the inter-packet timer 460 expires, then the inter-packet timer 460 is restarted in block 850 and the inter-packet counter 450 is updated in block 860. If the inter-packet counter 450 has reached its configured value 452, then even though the inter-packet timer 460 has not yet expired, an interrupt condition is triggered in block 880.

Thus, different interrupt blocks 400 may be configured for read and send completions, allowing varying control over interrupts and DMAs for sending and receiving. This mechanism allows a driver in the host 102 to configure the interrupt and DMA behavior as desired, for example setting long timers for good throughput numbers or setting very short timers for very low latency in high-end servers. The driver or the device 100 may, for example, detect the packet rate and type of packets, for example small or large) and decide whether to optimize for latency or for throughput and reduced CPU utilization in the host 102. The former may arise when smaller packets indicate requests or TCP acknowledgements, with fewer over all packets in many server embodiments. The former situation may arise when the device 100 is receiving large packets that indicate bulk data transfer or too many packets overall. In the former situation, the device 100 may shorten the period of the coalescing timer 420, while in the latter situation, the device 100 may increase the period of the coalescing timer dynamically.

FIG. 9 illustrated the generation of interrupts. In block 910, the coalescing timer 420 is initialized. Then in block 910, wait for the timer 420 to expire. After it expires, then in block 920 if an interrupt condition exists, trigger an interrupt in block 950 and wait for the interrupt to be acknowledged in block 960 before reinitializing the timer 420 in block 900. If no interrupt condition exists, then in block 930 check whether the IB 400 is running in continuous mode or one-shot mode. If the timer 420 is operating in continuous mode, restart the timer in block 900; otherwise, wait for an interrupt condition to occur in block 940, then proceed to trigger the interrupt in block 950 and wait for the interrupt to be acknowledged in block 960.

Turning back to FIG. 3, consider the RXQs 306, 308, which are associated with CQ 322, RXQs 310, 312, which are associated with CQ 320, and TXQs 316, 318. As described above, CQs 320, 322 and TXQs 316, 318 are associated with IB 334, which in turn points to a block of consumer/producer pointers 364 in the index table 360. As packets are received by the device 100 for a function that is associated with RXQs 306, 308, 310, 312, the buffers pointed to by RXQ entries are filled with the incoming data, and completions are reported on the CQs 320, 322. The corresponding producer pointers in the index block 364 are updated as the completions occur, but the producer pointers are not DMAed to the host 102 immediately with every completion.

Similarly, the consumer pointers in the index table block 364 pointed to by the IB 334, are updated as packets are sent from the buffers pointed to by the TXQs 316, 318. But an interrupt is not immediately triggered and the updated consumer pointers are not immediately DMAed to the host memory 104 as every packet is transmitted. Instead, the host 102 is only interrupted when the IB 334 triggers an interrupt to the host 102 at the expiration of the coalescing timer, at which time all four entries in the index table block are DMAed to the host 102. Because an interrupt is not triggered by the IB 334 upon every update of one of the consumer/producer pointers in the index table block 364, the number of interrupts is moderated by the use of the coalescing timer and the inter-packet mechanism.

For this example, assume that the IB 334 operates in continuous mode, as described above, and that the inter-packet mechanism is enabled. The inter-packet mechanism may indicate an interrupt condition upon the expiration of the inter-packet timer 450, 452, indicating that a configured time has passed since the last interrupt condition. In addition, as RXQs 306, 308, 310, 312 generate completions for received packets to the CQs 320, 322, and the TXQs transmit packets, the counter 460 in the IB 334 is updated. The inter-packet mechanism may also indicate an interrupt condition when the counter indicates that the number of events configured by the counter configuration value 462 has occurred.

Once the interrupt condition is indicated, the next time the coalescing timer 420, 422 expires, an interrupt is triggered, and a DMA of the index table block 364 is performed. The inter-packet mechanism thus configurably limits the latency between interrupt conditions occurring, while the coalescing timer allows potentially multiple interrupt conditions to occur before actually triggering an interrupt. The combination of the coalescing timer 420, 422 and the inter-packet mechanism 450, 452, 460, 462 has the effect of combining what would have been multiple interrupts into a single interrupt and multiple DMAs into a single DMA.

In another example, when an interrupt block 400 associated with a TXQ is running with a continuous timer and the IPDE flag set, as packets are sent and the inter-packet counter 450 reaches its configured value 450, the index table 360 entries are DMAed, resetting the inter-packet counter to is initial value, without interrupting the host 102. The host can detect the new send completions, process the completions, and acknowledge them. That resets the coalescing timer 420 and the inter-packet counter 450, while continuing to defer interrupts. If the host 102 does not acknowledge the completions and the coalescing timer 420 expires, then an interrupt is sent to the host 102. Since a DMA of the index table 360 entries to the host is done only when the inter-packet counter reaches its configured value 450, a DMA of send completion is not performed for every send completion, thus the number of DMAs to the host for send completions is reduced.

In another example, an IP 400 is associated with a CQ, and is configured in one-shot mode with the IPE flag set, disabling the IPDE mechanism. As a train of packets is received, instead of trigging an interrupt on the first packet of the train, a number of packets may be received and receive completions generated, before the inter-packet mechanism allows triggering an interrupt condition and restarting the coalescing timer 420.

Thus, as described above, the host queue manager 200 provides interrupt moderation for the device 100, coalescing interrupts using interrupt blocks, thus delaying interrupting the host 102 until a batch of completions can be processed (or sufficient time has passed), thus avoiding the need to interrupt the host 102 for every read or send completion.

Aspects of the invention are described as a method of control or manipulation of data, and may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for tangibly embodying information in a form readable by a machine (e.g., a computer). For example, a machine-readable medium (sometimes referred to as a program storage device or a computer readable medium) may include read-only memory (ROM), random-access memory (RAM), magnetic disc storage media, optical storage media, flash-memory devices, electrical, optical, and others.

Various changes in the details of the illustrated operational methods are possible without departing from the scope of the following claims. For instance, illustrative flowchart steps or process steps of FIGS. 7-9 may perform the identified steps in an order different from that disclosed here. Alternatively, some embodiments may combine the activities described herein as being separate steps. Similarly, one or more of the described steps may be omitted, depending upon the specific operational environment in which the method is being implemented. In addition, acts in accordance with FIGS. 7-9 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices, sometimes called computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

We claim:

1. A method, comprising:
   determining whether an interrupt condition exists in a first device upon expiration of a first timer;
   triggering an interrupt of a second device if an interrupt condition exists;
   transferring information associated with a plurality of events to the second device; and
   initializing the first timer upon receiving an acknowledgment of the interrupt from the second device.

2. The method of claim 1, further comprising:
   initializing the first timer if no interrupt condition exists.

3. The method of claim 1, wherein determining whether an interrupt condition exists comprises:
   determining whether an interrupt condition occurred prior to expiration of the first timer.

4. The method of claim 1, wherein determining whether an interrupt condition exists comprises:
   keeping the first timer in an expired state until an interrupt condition occurs.

5. The method of claim 1, further comprising:
   indicating an interrupt condition responsive to an inter-event mechanism.

6. The method of claim 5,
   wherein the inter-event mechanism comprises:
      a second timer; and
      a first counter, updated upon the occurrence of each event of the plurality of events;
   further comprising:
      indicating an interrupt condition exists if the second timer has expired; and
      indicating an interrupt condition exists if the first counter has reached a predetermined counter value.

7. The method of claim 1, further comprising:
   disabling interrupts from the first device; and
   indicating that an interrupt condition exists if any events of the plurality of events are unacknowledged by the second device.

8. The method of claim 1, further comprising:
   storing a plurality of interrupt information items in an index table, wherein the interrupt information items are related to servicing of the plurality of events by the second device, and
   storing the plurality of interrupt information items in a memory of the second device responsive to the act of triggering an interrupt.

9. The method of claim 8, further comprising:
   storing the plurality of interrupt information items in a memory of the second device responsive to a counter achieving a predetermined counter value; and
   resetting the counter.

10. The method of claim 8, wherein storing a plurality of interrupt information items in an index table comprises:
    associating a receive queue or a transmit queue with an interrupt block;
    storing an offset into the index table into the interrupt block corresponding to the associated receive queue or transmit queue;
    storing a member of the plurality of interrupt information items corresponding to the receive queue or the transmit queue in the index table based on the offset.

11. The method of claim 10, wherein associating a receive queue or a transmit queue with an interrupt block comprises:
    associating a receive queue with a completion queue; and
    associating the completion queue with the interrupt block,
    wherein storing an offset into the index table into the interrupt block comprises:
       storing an offset into the index table into the interrupt block corresponding to the completion queue, and
    wherein storing a member of the plurality of interrupt information items corresponding to the receive queue or the transmit queue comprises:
       storing a member of the plurality of interrupt information items corresponding to the completion queue in the index table based on the offset.

12. A queue manager, comprising:
    a plurality of queues;
    a plurality of interrupt blocks, each associated with one or more of the plurality of queues and updated responsive to events corresponding to the one or more associated queues, comprising:
       a first timer;
    an index table, configured for storing information for servicing interrupts responsive to events corresponding to the plurality of queues; and
    interrupt coalescing logic, comprising:
       first timer initialization logic, configured to initialize the first timer to a first predetermined value;
       interrupt condition logic;
       first timer expiration logic, configured to trigger an interrupt upon expiration of the first timer if the interrupt condition logic indicates an interrupt condition exists; and
       interrupt acknowledgment logic, adapted to cause the first timer initialization logic to initialize the first timer responsive to receiving an interrupt acknowledgment.

13. The queue manager of claim 12, wherein the first timer expiration logic is further configured to cause the first timer initialization logic to initialize the first timer if the interrupt condition logic indicates no interrupt condition exists.

14. The queue manager of claim 12, wherein the first timer expiration logic is further configured to keep the first timer in an expired state until the interrupt condition logic indicates that an interrupt condition exists.

15. The queue manager of claim 12,
wherein each of the plurality of interrupt blocks further comprises:
a second timer; and
a first counter, updated responsive to events corresponding to the one or more associated queues,
wherein the interrupt condition logic indicates an interrupt condition upon expiration of the second timer, and
wherein the interrupt condition logic indicates an interrupt condition upon the first counter reaching a predetermined counter value.

16. The queue manager of claim 12,
wherein each of the plurality of interrupt blocks further comprises:
a first counter, updated responsive to events corresponding to the one or more associated queues,
wherein the queue manager further comprises:
a data transfer logic, configured to transfer information from the index table upon either the first counter reaching a predetermined counter value or the triggering of an interrupt by the first timer expiration logic.

17. The queue manager of claim 12, wherein the plurality of queues comprises:
a plurality of receive queues;
a plurality of transmit queues; and
a plurality of completion queues, each associated with at least one of the plurality of receive queues;
wherein each of the plurality of transmit queues is associated with an interrupt block of the plurality of interrupt blocks,
wherein each of the plurality of completion queues is associated with an interrupt block of the plurality of interrupt blocks.

18. A peripheral device, comprising:
receive agent logic;
transmit agent logic;
a queue manager, coupled to the receive agent logic and the transmit agent logic, comprising:
a plurality of queues each configurably associated with the receive agent logic or the transmit agent logic;
a plurality of interrupt blocks, each associated with one or more of the plurality of queues and updated responsive to events corresponding to the one or more associated queues, comprising:
a first timer;
an index table, configured for storing information for servicing interrupts responsive to events corresponding to the plurality of queues; and
interrupt coalescing logic, comprising:
first timer initialization logic, configured to initialize the first timer of an interrupt block of the plurality of interrupt blocks to a first predetermined value associated with the interrupt block;
interrupt condition logic;
first timer expiration logic, configured to trigger an interrupt upon expiration of the first timer if the interrupt condition logic indicates an interrupt condition exists; and
interrupt acknowledgment logic, adapted to cause the first timer initialization logic to initialize the first timer responsive to receiving an interrupt acknowledgment.

19. The peripheral device of claim 18, wherein the first timer expiration logic is further configured to cause the first timer initialization logic to initialize the first timer if the interrupt condition logic indicates no interrupt condition exists.

20. The peripheral device of claim 18, wherein the first timer expiration logic is further configured to keep the first timer in an expired state until the interrupt condition logic indicates that an interrupt condition exists.

21. The peripheral device of claim 18,
wherein each of the plurality of interrupt blocks further comprises:
a second timer; and
a first counter, updated responsive to events corresponding to the one or more associated queues,
wherein the interrupt condition logic indicates an interrupt condition upon expiration of the second timer, and
wherein the interrupt condition logic indicates an interrupt condition upon the first counter reaching a predetermined counter value.

22. The peripheral device of claim 21,
wherein each of the plurality of interrupt blocks further comprises:
a first counter, updated responsive to events corresponding to the one or more associated queues,
wherein the queue manager further comprises:
a data transfer logic, configured to transfer information from the index table upon either the first counter reaching the predetermined counter value or the triggering of an interrupt by the first timer expiration logic.

23. The peripheral device of claim 18, wherein the plurality of queues comprises:
a plurality of receive queues, associated with the receive agent logic;
a plurality of transmit queues, associated with the transmit agent logic;
a plurality of completion queues, each associated with at least one of the plurality of receive queues;
wherein each of the plurality of transmit queues is associated with an interrupt block of the plurality of interrupt blocks,
wherein each of the plurality of completion queues is associated with an interrupt block of the plurality of interrupt blocks.

24. The peripheral device of claim 18, further comprising:
configuration logic, adapted to associate one or more of the plurality of queues with an interrupt block of the plurality of interrupt blocks.

25. The peripheral device of claim 18, further comprising:
configuration logic, adapted to associate a message-signaled interrupt vector with an interrupt block of the plurality of interrupt blocks.

26. The peripheral device of claim 18, wherein the first predetermined value for each of the plurality of interrupt blocks is independently configurable.

27. The peripheral device of claim 18, wherein the interrupt condition logic comprises:
configuration logic to configure interrupt conditions independently for each of the plurality of interrupt blocks.

* * * * *